Nov. 7, 1933.   R. S. OHL   1,933,680
SIGNALING SYSTEM
Filed Dec. 1, 1927
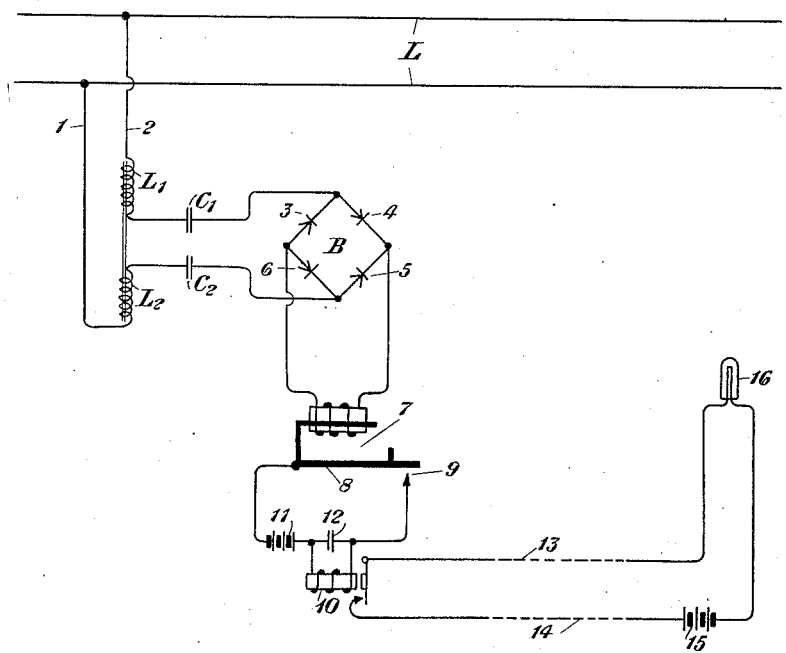
INVENTOR.
R. S. Ohl
BY
ATTORNEY Patented Nov. 7, 1933

1,933,680

UNITED STATES PATENT OFFICE 1,933,680

SIGNALING SYSTEM

Russell S. Ohl, Little Silver, N. J., assignor to American Telephone and Telegraph Company, a corporation of New York Application December 1, 1927. Serial No. 237,113

2 Claims. (Cl. 175—320)

This invention relates to signaling systems and more particularly to improvements in relay arrangements utilized to control circuits of such systems.

One of the purposes of the invention is to provide sensitive arrangements whereby a signaling system may be connected to a transmission line without utilizing vacuum tubes. A further feature of the arrangements of the invention consists in the fact that they may be made responsive to alternating current but at the same time will have the sensitivity of arrangements, such as relays, responsive to direct current. Another advantage of the arrangements of the invention consists in the fact that they afford improved selectivity features, such as those of a vibrating reed relay which is capable of being mechanically tuned to a desired frequency. Other features and advantages of the invention will appear more fully from the detailed description thereof hereinafter given.

The invention may be more fully understood from the following description together with the accompanying drawing in the figure of which is shown a circuit diagram illustrating a preferred form of the invention.

In the drawing is shown a section of transmission line L. Connected to the sides of line L is an arrangement comprising the conductors 1 and 2, inductances $L_1$ and $L_2$, condensers $C_1$ and $C_2$ and a rectifier B. The rectifier B is of the well known bridge type and may be composed of the rectifier units 3, 4, 5 and 6, which in turn are preferably of the contact variety. The inductances $L_1$ and $L_2$ and condensers $C_1$ and $C_2$ may be adjusted to act as a filter to allow transmission of currents of a desired frequency. For purposes of illustration it will be assumed that this tuning or filtering arrangement will allow selective transmission to the rectifier B of a signaling frequency of 135 cycles. It is pointed out, however, that other signaling frequencies may equally well be utilized. The output of rectifier B will be a pulsating current made up principally of a direct current component and a second harmonic of the original signaling frequency. Due to the characteristics of the current in the output of the rectifier B, the selectivity feature of a vibrating reed relay can here be made use of in a simpler relay arrangement than has heretofore been used with the vibrating reed type of relay. Ordinarily a relay of this type is operated directly from alternating current. When this is done, it is necessary to include a permanent magnet to polarize the relay. In the relay arrangement 7 shown connected to the output of the rectifier it is not necessary to provide a permanent magnet. This is due to the fact that the pulsating current in the rectifier output contains a component of direct current which, when flowing through the relay winding, is sufficient to give the same effect as the permanent magnet, while at the same time the second harmonic component of the pulsating current will cause the reed to vibrate at the double frequency. Accordingly it will be seen that the arrangements of the invention heretofore described will allow a vibrating reed type of relay to be utilized which may be simpler in construction than heretofore and furthermore such a relay may be connected to the transmission line without the use of vacuum tubes.

Connected to the tuned reed 8 is a circuit including the battery 11, the winding of a relay 10, and the contact 9. Bridged around the winding of relay 10 is a condenser 12 which facilitates a steady flow of direct current through relay 10. It is pointed out that in the arrangements as shown any surges of current which may leak through the filtering arrangements $L_1$, $L_2$, $C_1$, $C_2$ because of their excessive magnitude, might cause sufficient current to flow through the vibrating reed relay 7 so that the reed 8 would be moved. However, the reed must be caused to vibrate at its natural period in making contact at 9 to operate relay 10, as the relay 10 by means of condenser 12 may be made a delay relay and requires a regular sequence of contacts at 9 before it will operate. This provides an additional selectivity feature against undesired disturbances from line L. It is pointed out that, as the rectifier is of the full wave type, the vibrating reed is tuned to the second harmonic of the signaling frequency utilized. Accordingly the transmission of the signaling frequency over line L will operate the reed 8 at its natural period, which in turn will operate the relay 10. This will close the signaling circuit comprising conductors 13 and 14, battery 15, and lamp 16, thereby operating the signal lamp 16.

While the invention has been disclosed as embodied in certain specific arrangements which are deemed desirable, it is understood that it is capable of embodiment in many and other widely varied forms without departing from the spirit of the invention as defined by the appended claims.

What is claimed is:

1. A relay circuit comprising a rectifier having its input connected to an alternating current source whereby its output will include a direct current component and a pulsating current component of a frequency which is a harmonic of the input current frequency, a relay having its winding so connected in the output circuit of said rectifier that it will be polarized by said direct current component and operated by said pulsating current component, and a vibrating reed controlled by said relay.

2. A relay circuit comprising a rectifier having its input connected to an alternating current source whereby its output will include a direct current component and a pulsating current component of a frequency which is a harmonic of the input current frequency, a vibrating reed relay having an electromagnetic winding so connected in the output circuit of said rectifier that it will be polarized by said direct current component and operated by said pulsating component, and a reed tuned to said harmonic frequency and controlled by said winding to operate at the harmonic frequency.

RUSSELL S. OHL.